(12) United States Patent
Bramley

(10) Patent No.: US 6,567,556 B1
(45) Date of Patent: May 20, 2003

(54) METHOD AND DEVICE FOR DECODING IMAGES, ALLOWING A REDUCED NUMBER OF OPENINGS OF MEMORY PAGES IN THE PREDICTION PROCESSING

(75) Inventor: Richard Bramley, Grenoble (FR)

(73) Assignee: STMicroelectronics SA, Gentilly (FR)

( * ) Notice: Subject to any disclaimer, the term of this patent is extended or adjusted under 35 U.S.C. 154(b) by 0 days.

(21) Appl. No.: 09/314,427

(22) Filed: May 18, 1999

(30) Foreign Application Priority Data

Jun. 23, 1998 (FR) .............................. 98 07932

(51) Int. Cl.$^7$ .............................. G06K 9/36; G06K 9/46; G06K 9/54; H04B 1/66; G06F 12/00

(52) U.S. Cl. ...................... 382/233; 382/236; 382/232; 382/238; 382/305; 375/240.12; 375/240.13; 375/240.15; 375/240.25; 711/105; 711/150; 711/168

(58) Field of Search .................. 382/232, 233, 382/236, 238, 250, 305; 375/240.12, 240.13, 240.15, 240.16, 240.2, 240.24, 240.25, 240.28; 348/412.1, 413.1, 419.1, 394.1; 345/530, 533, 541, 544; 386/109, 111; 711/100, 101, 105, 147, 150, 168

(56) References Cited

U.S. PATENT DOCUMENTS

| | | | |
|---|---|---|---|
| 4,758,881 A | 7/1988 | Laspada | 358/21 |
| 5,195,182 A | 3/1993 | Sasson | 395/250 |
| 5,448,310 A * | 9/1995 | Kopet et al. | 348/699 |
| 5,986,711 A * | 11/1999 | Pau | 348/408 |
| 6,088,047 A * | 7/2000 | Bose et al. | 345/517 |
| 6,215,822 B1 * | 4/2001 | Bose et al. | 375/240.16 |

FOREIGN PATENT DOCUMENTS

| | | |
|---|---|---|
| EP | 0 587 443 A2 | 9/1993 |
| EP | 0 716 395 A1 | 11/1995 |
| EP | 0 863 676 A2 | 1/1998 |
| JP | 08130713 | 2/1994 |

* cited by examiner

Primary Examiner—Phuoc Tran
Assistant Examiner—Amir Alavi
(74) Attorney, Agent, or Firm—Allen, Dyer, Doppelt, Milbrath & Gilchrist, P.A.; Lisa K. Jorgenson (57) ABSTRACT

A method and device decode compressed images, and in particular, images compressed according to the MPEG standards, and especially bidirectional images. The time period during which the memory is accessed by the decoder is minimized by extracting a predictor macroblock of a size greater than or equal to that of the macroblocks of the image stored in memory, from the memory. This extraction comprises accessing pages of the memory so as to simultaneously open with each page access, two pages situated respectively in two memory banks and respectively containing two macroblocks belonging respectively to two consecutive rows of macroblocks and to the same column of macroblocks of the stored image. A columnwise reading of some of the pixels of the two macroblocks accessed during the page access is then performed, so as to obtain some of the corresponding pixels of the predictor macroblock.

19 Claims, 10 Drawing Sheets

METHOD AND DEVICE FOR DECODING IMAGES, ALLOWING A REDUCED NUMBER OF OPENINGS OF MEMORY PAGES IN THE PREDICTION PROCESSING

FIELD OF THE INVENTION

The invention relates to the decoding of compressed images and in particular to the decoding of images which are compressed according to an MPEG standard. More particularly, the invention relates to the exchange of data between a circuit for decoding the images and a dynamic memory.

BACKGROUND OF THE INVENTION

According to various image compression standards, especially MPEG ("Motion Pictures Experts Group"), the images are decoded in blocks, or macroblocks, generally of 16×16 pixels. The macroblocks can be of various formats. The most commonly used format is the one termed 4:2:0 according to which each macroblock contains four blocks of 8×8 luminance pixels of eight bits and two blocks of 8×8 chrominance pixels of eight bits.

The images processed are essentially of three types, namely an "intra" type, a "predicted" type and a "bidirectional" type. The person skilled in the art is aware that the macroblocks of an "intra" image do not undergo any motion compensation. In a predicted image, each macroblock can undergo a motion compensation which includes combining the macroblock with another macroblock, the "predictor", fetched from a previously decoded image. Each macroblock of a bidirectional image can undergo a motion compensation which includes combining the macroblock with two other predictor macroblocks, fetched respectively from two previously decoded images. The positions of the predictor macroblocks are determined by motion vectors.

An MPEG decoding system, referred to more simply hereafter as an "MPEG decoder", must communicate with a dynamic memory to carry out the decoding of the images, particularly those requiring the contents of at least one previously decoded image stored in this memory for their decoding. Such a memory plays an essential role in the decoding of these images. Now, with current production technologies, the following are produced within one and the same chip: an MPEG decoder, processing means comprising a microprocessor and intended to perform channel search operations when the assembly is built into a satellite decoder for example, as well as a circuit for generating graphical elements which are to be inlaid onto images and correspond for example to interactive menus called up by a remote control and allowing the user to perform adjustments on certain operating parameters of their television or of their reception device.

Now, all these elements share the same dynamic memory. It is therefore especially important to be able to reduce the memory passband used, i.e. the number of clock cycles during which this memory is accessed by one of the elements so as to perform a particular phase of processing, and in order to be able to leave some time available so that the other elements can access this memory before the first element begins another phase of processing.

SUMMARY OF THE INVENTION

An object of the invention is to achieve this goal at the level of the MPEG decoder. Stated otherwise, it is an object of the invention to minimize the time periods during which the memory is accessed by the MPEG decoder, in particular while decoding the images.

The invention therefore proposes a macroblock-wise method of decoding an inbound image coded by compressed data, this image being of the type requiring the contents of at least one previously decoded image stored in a memory for its decoding. According to a general characteristic of the invention, the memory is a random-access synchronous dynamic memory comprising two memory banks organized into pages (SDRAM memory). Page accesses (memory accesses) to the memory are performed, simultaneously opening two pages situated respectively in the two memory banks so as to store respectively in the two open pages, two macroblocks belonging respectively to two consecutive rows of macroblocks of the previously decoded image and to the same column of macroblocks of the previously decoded image. The decoding of each macroblock of the inbound image then comprises the extracting from the memory of a predictor macroblock of a size greater than or equal to that of the macroblocks of the image stored in memory. This extraction comprises accessing pages of the memory so as to open simultaneously with each page access, two pages situated respectively in the two memory banks and respectively containing two macroblocks belonging respectively to two consecutive rows of macroblocks and to the same column of macroblocks of the stored image. A columnwise reading of some of the pixels of the two macroblocks accessed during the page access is then performed, so as to obtain some of the corresponding pixels of the predictor macroblock.

The invention thus makes it possible to reduce the number of page accesses to the memory, and consequently the number of clock cycles required for opening these pages. The invention consequently allows an appreciable reduction in the memory passband used.

Although the invention applies to the decoding of any image of the type requiring the contents of at least one previously decoded image for its decoding, for example a predicted image, the invention applies particularly advantageously to the decoding of an image of a bidirectional type requiring the contents of two previously decoded images stored in the memory for its decoding, when this bidirectional image is decoded on the fly. This is because the on-the-fly decoding of bidirectional images is performed by two successive decodings of the image without storing the reconstructed image in the image memory. More precisely, each bidirectional image is decoded a first time while a first frame of the image is displayed directly, and a second time while a second frame of the image is displaced directly, the two frames corresponding to lines of different parities of the image.

The on-the-fly decoding of bidirectional images makes it possible to reduce the size of the SDRAM memory used, and the decrease in the number of page accesses to the SDRAM memory here takes on a definite advantage by virtue of the two successive decodings of the bidirectional image.

The subject of the invention is also a device for processing inbound images, coded by compressed data, this device comprising decoding means able to decode each current inbound image macroblock by macroblock, a memory linked to the decoding means and able to store at least some of the decoded images, and control means linked to the decoding means and to the memory. According to a general characteristic of the invention, the memory is a random-access synchronous dynamic memory comprising two memory banks organized into pages. The control means are able to perform page accesses to the memory simultaneously opening two pages situated respectively in the two memory banks so as to store respectively in the two open pages, two macroblocks belonging respectively to two consecutive rows of macroblocks and to the same column of macroblocks of the previously decoded image. The control means are able to extract from the memory, for the decoding of each macroblock of the inbound image, a predictor macroblock of a size greater than or equal to that of the macroblocks of the image stored in memory, this extraction comprising page accesses to the memory so as to open simultaneously with each page access, two pages situated respectively in the two memory banks and respectively containing two macroblocks belonging respectively to two consecutive rows of macroblocks of the stored image and to the same column of macroblocks of this stored image. The memory then delivers columnwise some of the pixels of the two macroblocks accessed during the page access, so as to obtain some of the corresponding pixels of the predictor macroblock.

BRIEF DESCRIPTION OF THE DRAWINGS

Other advantages and characteristics of the invention will emerge on examining the detailed description of entirely non-limiting modes of implementation and embodiments, and the appended drawings in which.

DETAILED DESCRIPTION OF THE PREFERRED EMBODIMENTS

Figure 1:
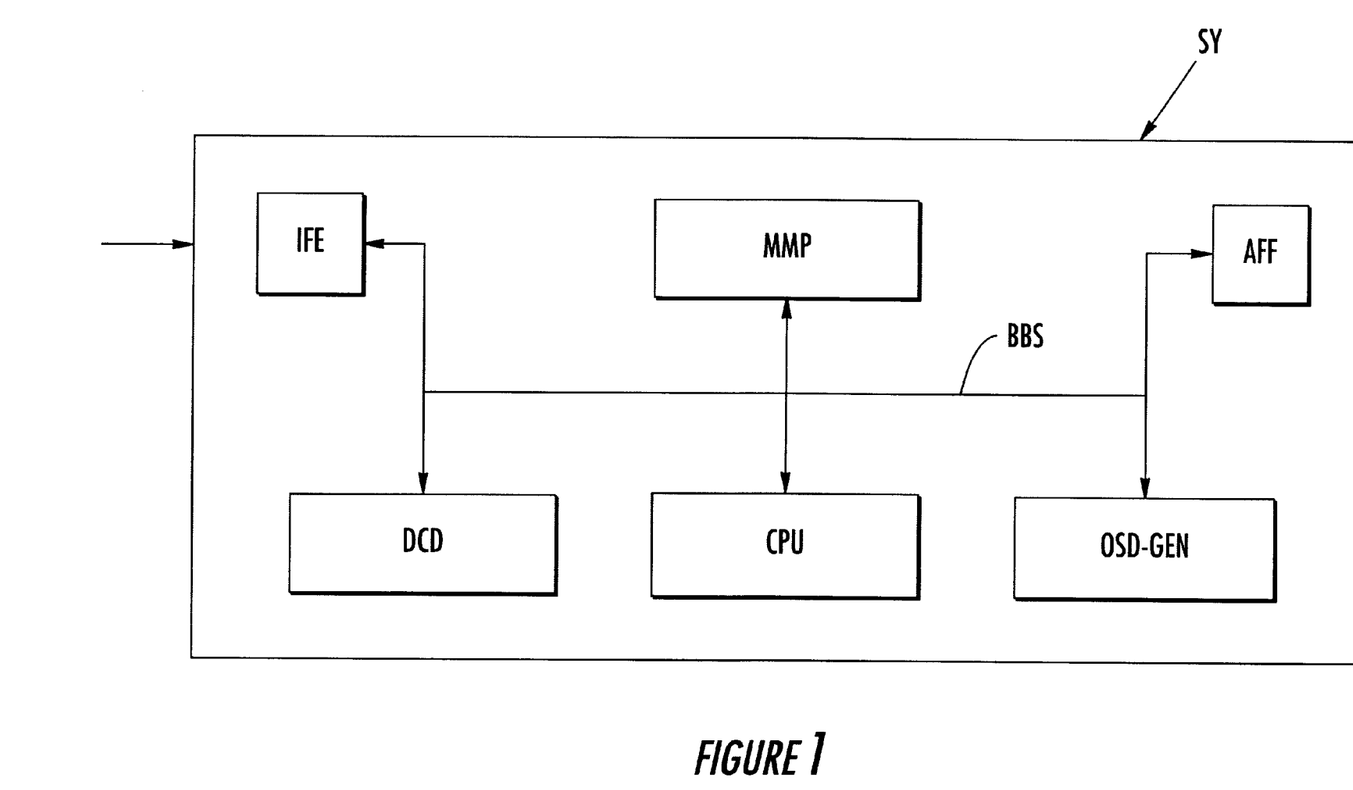
FIG. 1 is a schematic overview of a system for processing images incorporating a device for processing images according to the invention.

In FIG. 1, the reference SY generally denotes a system for processing digital images incorporating, for example, a satellite decoder and/or a television. In this system SY, input means IFE receive, for example, from a satellite antenna or from a digital disk (which are not represented here for the sake of simplification), a stream of data compressed according, for example, to the MPEG standards. A device DCD for processing images according to the invention, or MPEG decoder, decodes the coded images on the basis of these compressed data for the purpose of displaying them on a display screen AFF.

The system SY moreover comprises a microprocessor CPU which is able, for example, to manage the decoding of the various satellite channels, as well as a generator OSD-GEN of graphical information intended to be inlaid on the screen superimposed on the video images, for example, interactive menus obtained by actuating a television remote control. Finally, an important element of this system SY is a dynamic memory MMP which is shared between these various elements. It is therefore preferable to reduce the memory passband used so as to allow the various elements of the system SY to access it as often as possible. This is one of the objects of the invention. The assembly of elements of FIG. 1 communicate to one another via a bidirectional bus BBS.

Figure 2:
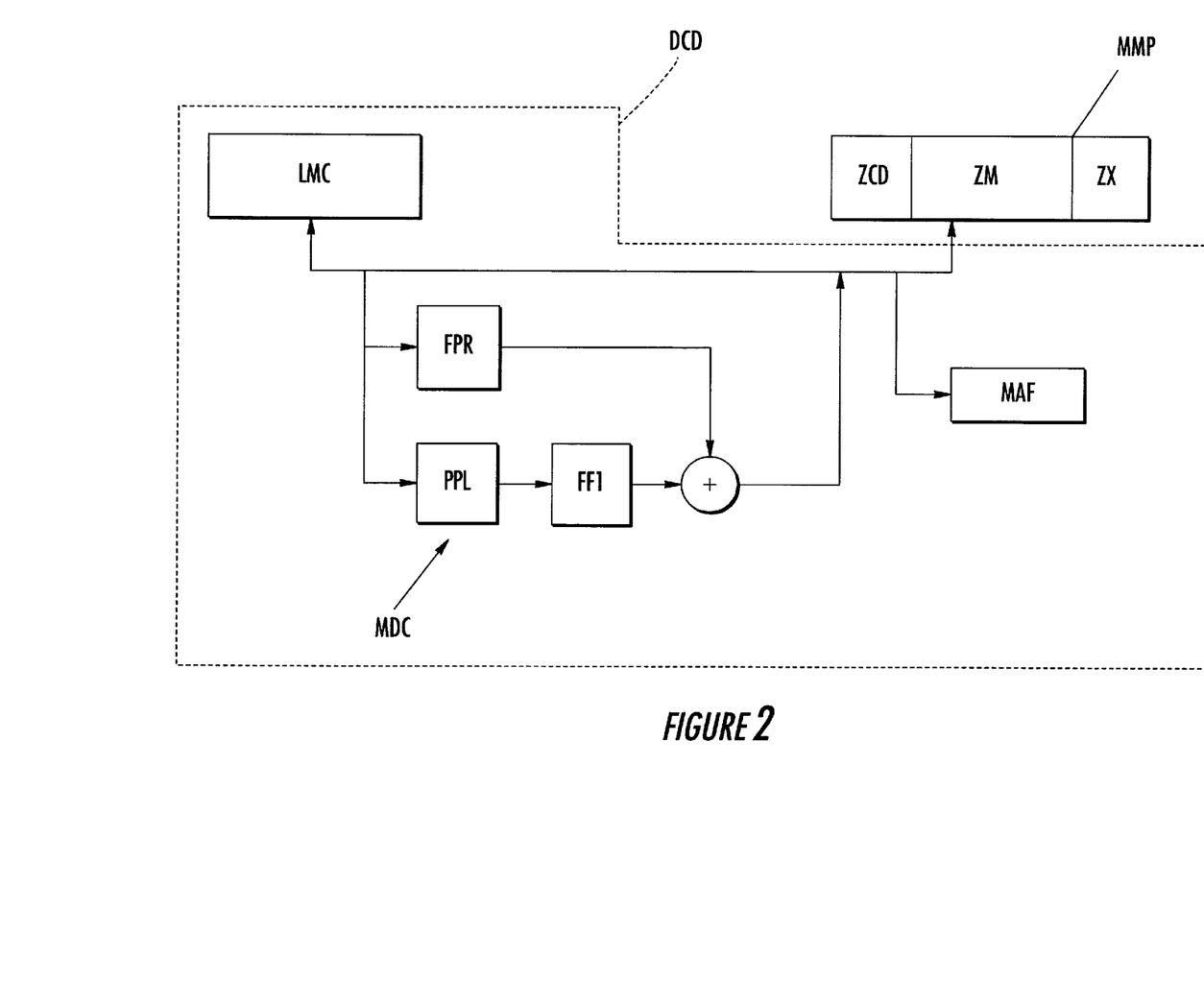
FIG. 2 is a more detailed schematic overview of a processing device according to the invention.

In FIG. 2, the decoder DCD comprises "decoding" means MDC, and "display management" means MAF. The decoding means MDC comprises a "pipeline" circuit PPL which receives the compressed data through a 64-bit bus and delivers the luminance and chrominance blocks of the processed macroblocks to an adder by way of a memory FF1 of the "first-in first-out" (FIFO) type. Moreover, the adder receives corresponding blocks of filtered predictor macroblocks delivered by a prediction circuit FPR on the basis of predictor macroblocks extracted from the memory MMP.

The pipeline circuit PPL generally performs a variable-length decoding (VLD), a run of zeros decoding (RLD), a zigzag scan to linear scan conversion and an inverse discrete cosine transform ($DCT^{-1}$) in a conventional manner. According to the MPEG standards, the prediction circuit FPR comprises a "half-pixel" filter intended, if a motion vector making it possible to fetch a predictor macroblock is not integral, for shifting this predictor macroblock by a half-pixel vertically and/or horizontally. The decoding means MDC communicates by way of the bus with the main memory MMP and the exchanges between this memory and the various elements of the decoder DCD are managed by main control means LMC.

The MPEG standards advocate that the memory MMP comprise an area of compressed data ZCD of at least 2.6 Megabits in which are written the compressed data awaiting processing, as well as an area ZX serving to store information to be displayed superimposed on the image and sound data. The capacity of this area ZX extending to around 1 Megabit. Apart from these areas, the memory MMP comprises an area ZM intended for storing two previously decoded images and, when the bidirectional images are not decoded on the fly, an image currently undergoing reconstruction. Generally, the memory MMP according to the invention is a random-access synchronous dynamic memory (SDRAM) comprising two memory banks organized as pages. By way of example, the memory MMP can be a 64-megabit SDRAM memory clocked at 100 MHZ.

Figure 3:
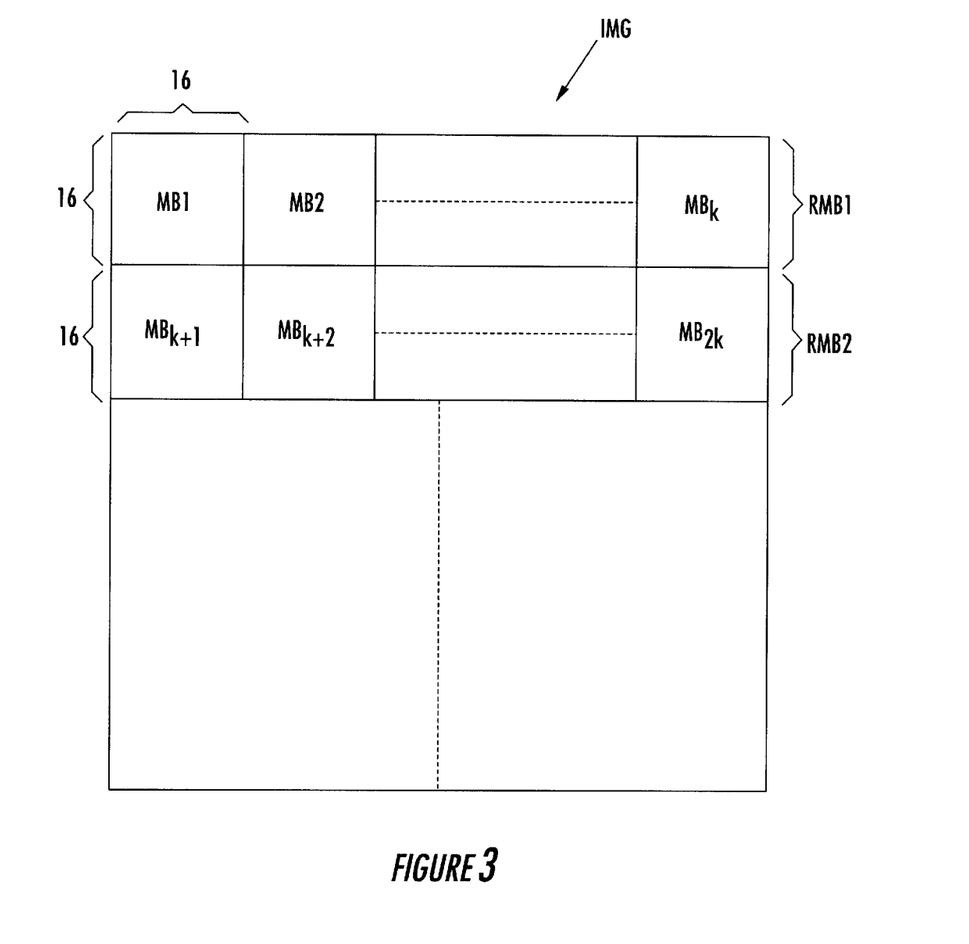
FIG. 3 is a schematic representation of an image already decoded.
Figure 4:
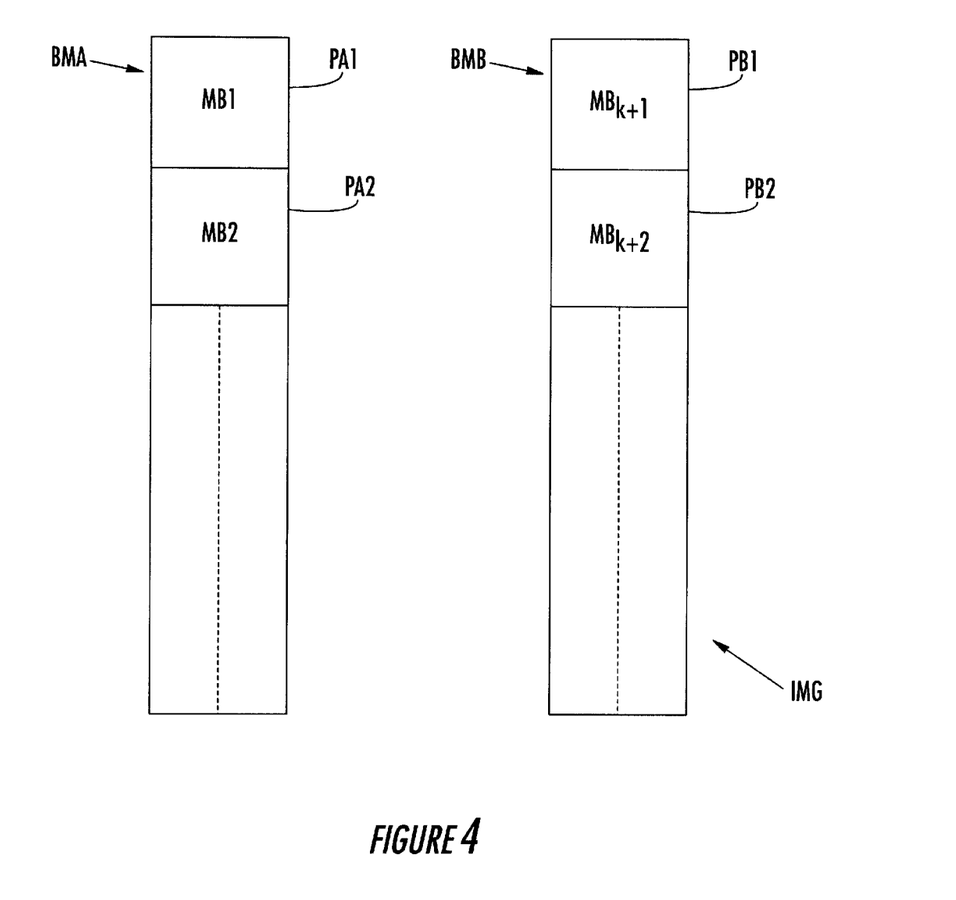
FIG. 4 schematically illustrates the storing of the various macroblocks of the decoded image of FIG. 3 in a memory according to the invention.

Referring more particularly to FIG. 3, it may be seen that a decoded image IMG comprises several rows RMB1, RMB2 ... of macroblocks MB1-$MB_k$, $MB_{k+1}$-$MB_{2k}$. Of size 16×16 pixels, the macroblocks are wholly stored respectively in memory pages of the memory MMP. This being so, for the purpose of limiting the number of page openings during accesses to the predictor macroblocks, the storing of the macroblocks of a decoded image is performed in a particularly advantageous manner, as illustrated in FIG. 4. More precisely, generally two consecutive rows of macroblocks of the decoded image are stored respectively in the two memory banks BMA and BMB of the memory MMP. Moreover, two macroblocks belonging respectively, not only to two consecutive rows of macroblocks of the decoded image, but also to the same column of macroblocks of this image, are stored in the two pages respectively situated in the two memory banks and are opened simultaneously during a page access. Thus, in FIG. 4, where it has been assumed, for the sake of simplification, that a memory page contains just a single macroblock, the macroblock MB1 of the first row is stored in page PA1 of the memory bank BMA while macroblock $MB_{k+1}$, belonging to the same column as macroblock MB1, is stored in page PB1 of the second memory bank BMB.

Figure 5:
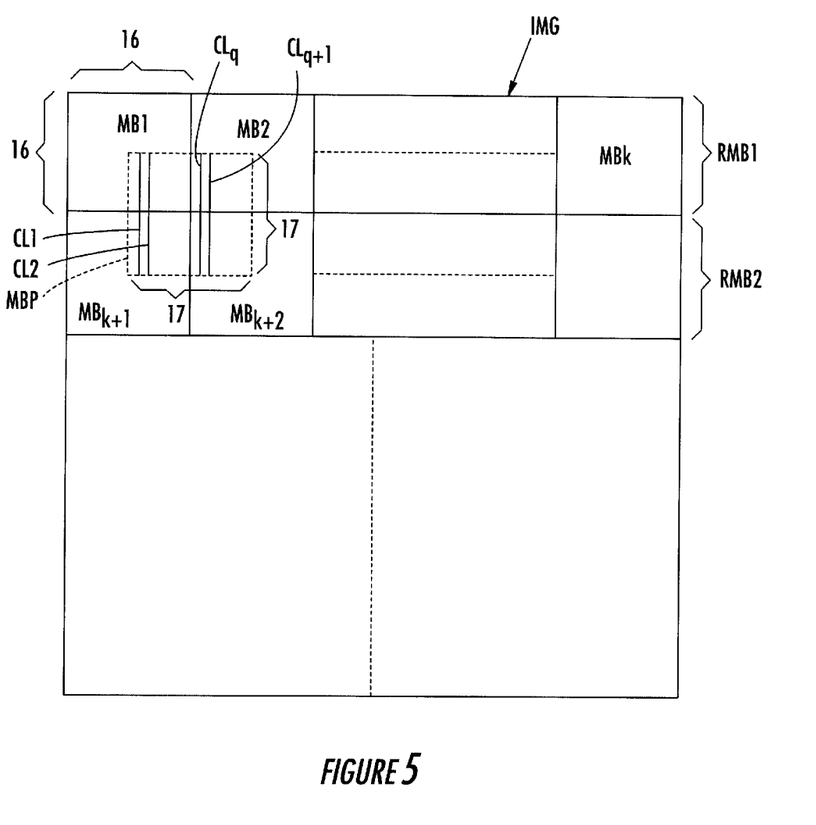
FIG. 5 schematically illustrates the decoding of a current image using a predictor macroblock extracted from the contents of the previously decoded image.

Reference is now made to FIG. 5 in order to describe the extraction and reading of a predictor macroblock MBP required for the decoding of a current image, for example, of the predicted or bidirectional type. A complete predictor macroblock comprises a luminance matrix of 17×17 pixels of eight bits and a chrominance matrix of 9×18 pixels of eight bits. Stated otherwise, the luminance and chrominance matrices of a predictor macroblock respectively comprise one column and one row of pixels more and one column and two rows of pixels more than the corresponding matrices of a normal macroblock, this being necessary for the half-pixel filtering in the prediction circuit FPR.

Furthermore, the first pixel of a predictor macroblock may coincide with any pixel of a macroblock of the previously decoded image IMG. Stated otherwise, the predictor macroblocks are not aligned with the boundaries of the pages and overlap several memory pages. This may occur equally well when the predictor macroblock is of greater size than that of the macroblocks of the image (MPEG standards) or else of size equal to that of the macroblocks of the image (other compression standards). Moreover, the pixels of each predictor macroblock are read column by column, for example in pairs of columns.

The use of a synchronous memory having two memory banks, in combination with the particular storage of the macroblocks of the decoded image as well as with the columnwise reading of the pixels, makes it possible to limit the number of page openings during the reading of each predictor macroblock. This is possible irrespective of the memory size. This is because, if it is assumed, for example, that the first macroblock of an image currently undergoing decoding requires the reading of the macroblock MBP of the previously decoded image IMG (FIG. 5) overlapping the four macroblocks MB1, MB2, $MB_{k+1}$ and $MB_{k+2}$ of this previously decoded image, the reading of the columns of the predictor macroblock (for example the columns CL1 and CL2) situated in the macroblock MB1 and $MB_{k+1}$ requires only a single page access to the memory MMP since the two pages PA1 and PB1 respectively storing these two macroblocks MB1 and $MB_{k+1}$ are simultaneously open during the page access. When all the columns of the predictor macroblock MBP extending over the macroblocks MB1 and $MB_{k+1}$ have been read, a second page access to the memory is performed so as simultaneously to open the pages PA2 and PB2 respectively storing the macroblocks MB2 and $MB_{k+2}$. The pixels of the columns (for example $CL_q$ and $CL_{q+1}$) extending over these two macroblocks MB2 and $MB_{k+2}$ are then read columnwise.

The person skilled in the art will therefore observe that the invention makes it possible to appreciably reduce the number of page openings in respect of the reading of the predictor macroblocks. This results therefore in an appreciable decrease in the clock cycles required for these page openings.

In a variant of the invention in which the bidirectional images are not decoded on the fly but stored likewise in the memory MMP, the display management means MAF may simply comprise, in the conventional manner, a video controller catering for the management of the display screen AFF and receiving the pixels of the image to be displayed, line by line, directly from the memory MMP. This being so, the embodiment which will now be described with reference to FIGS. 6–10 makes it possible to reduce the size of the memory MMP by performing an on-the-fly decoding of the bidirectional images, and also makes it possible to reduce the number of page openings during the displaying of "intra" and "predicted" images stored in the memory MMP.

Figure 6:
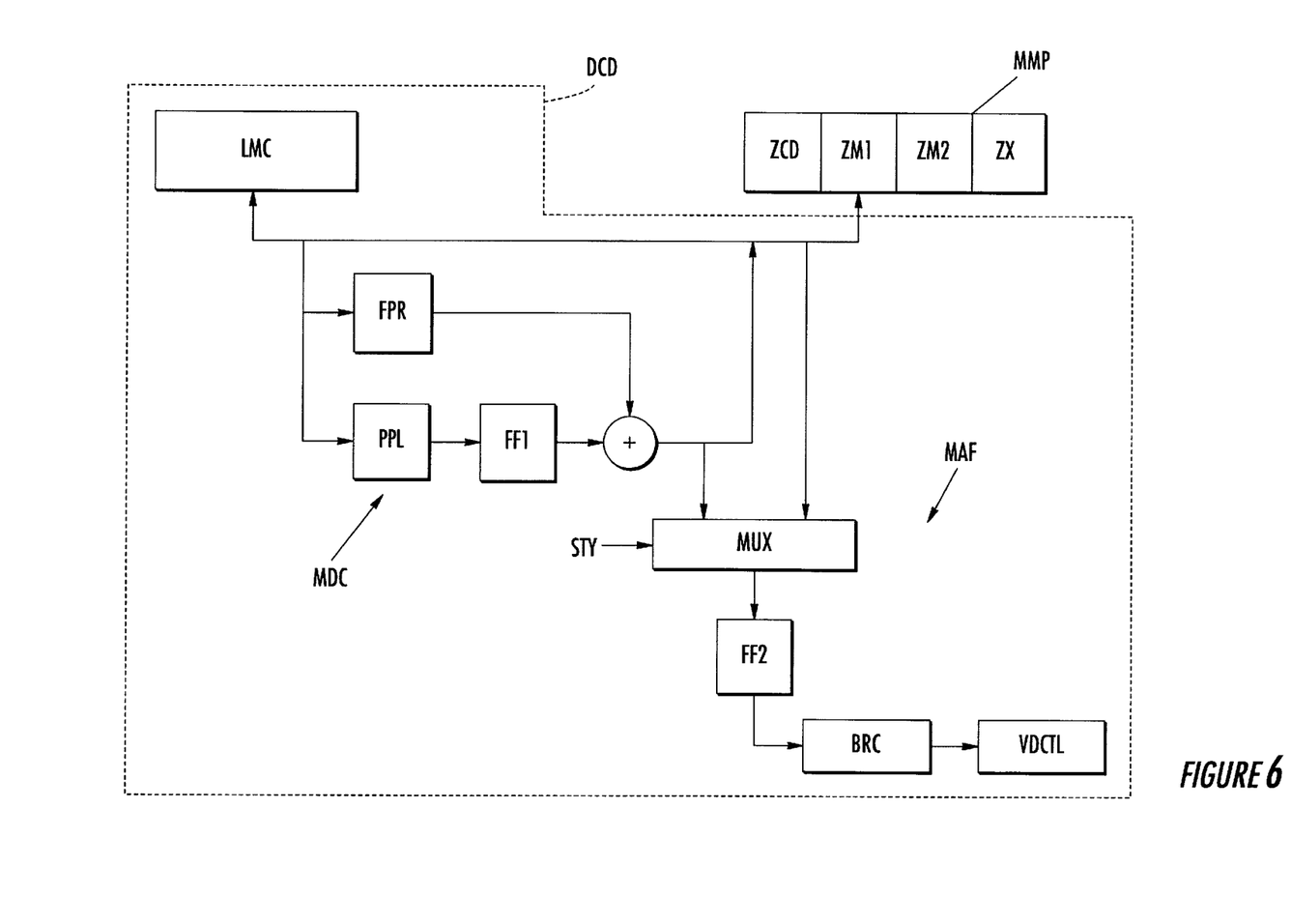
FIG. 6 is a schematic overview of a variant embodiment of a processing device according to the invention.

The display management means MAF here comprise a multiplexer MUX, a first input of which is linked to the output of the adder of the decoding means MDC, and a second input of which is linked to the output of the memory MMP. The output of the multiplexer is linked to a second buffer memory FF2 of the FIFO type. The output of this buffer memory FF2 is linked to a block/line converter BRC to whose structure and function is described in greater detail below. The output of the block BRC is linked to a video controller VDCTL catering for the management of the display screen AFF. The output of the multiplexer MUX is linked to one of its two inputs depending on a control signal STY representative of the type of image displayed, i.e. in this instance, either a bidirectional image, or an intra or predicted image.

The area ZM of the memory MMP comprises, in the example described here and corresponding to an on-the-fly decoding of the bidirectional images, only two additional areas for images ZM1 and ZM2. Each of these areas ZM1 and ZM2 must be capable of storing a PAL image (the largest according to international standards) of 720×576 pixels. By using the 4:2:0 format of the macroblocks, the pixels are the twelve bits and,the total size of the image is around 4.9 Megabits. In the embodiment described here, instead of storing a bidirectional image undergoing reconstruction in a memory area of the memory MMP so as to display it later, this bidirectional image is displayed on the fly, that is to say it is displayed while it is being decoded. This makes it possible to reduce the size of the memory MMP and to provide just two memory areas ZM1 and ZM2 for storing two previously decoded images, of the "intra" or "predicted" type.

If it is desired to display a bidirectional image undergoing decoding on the fly, it is initially necessary to display a first frame including the odd lines of the image, and then a second frame including the even lines of the image although the processing preceding display is generally performed on the overall image, i.e. in the order of the lines. This implies, if the decoding means MDC decode the lines at the rate at which they are displayed, that the $(2K-1)^{th}$ line must be displayed at the moment at which the decoding means MDC are decoding the $K^{th}$ line. Stated otherwise, at the moment at which the first frame ought to be displayed, the decoder will have been able to decode only half this frame.

Thus provision is made to decode each bidirectional image twice over the duration of display of this image. In this case, at the moment at which the $2K-1^{th}$ line is to be displayed, 2K lines will have been decoded. More precisely, at the moment at which the first frame is displayed, the complete image will have been decoded as will therefore both frames of this image. Since display is performed on the fly, the second frame which was decoded but not displayed is lost. This second frame is displayed while the image is being decoded a second time.

Figure 7:
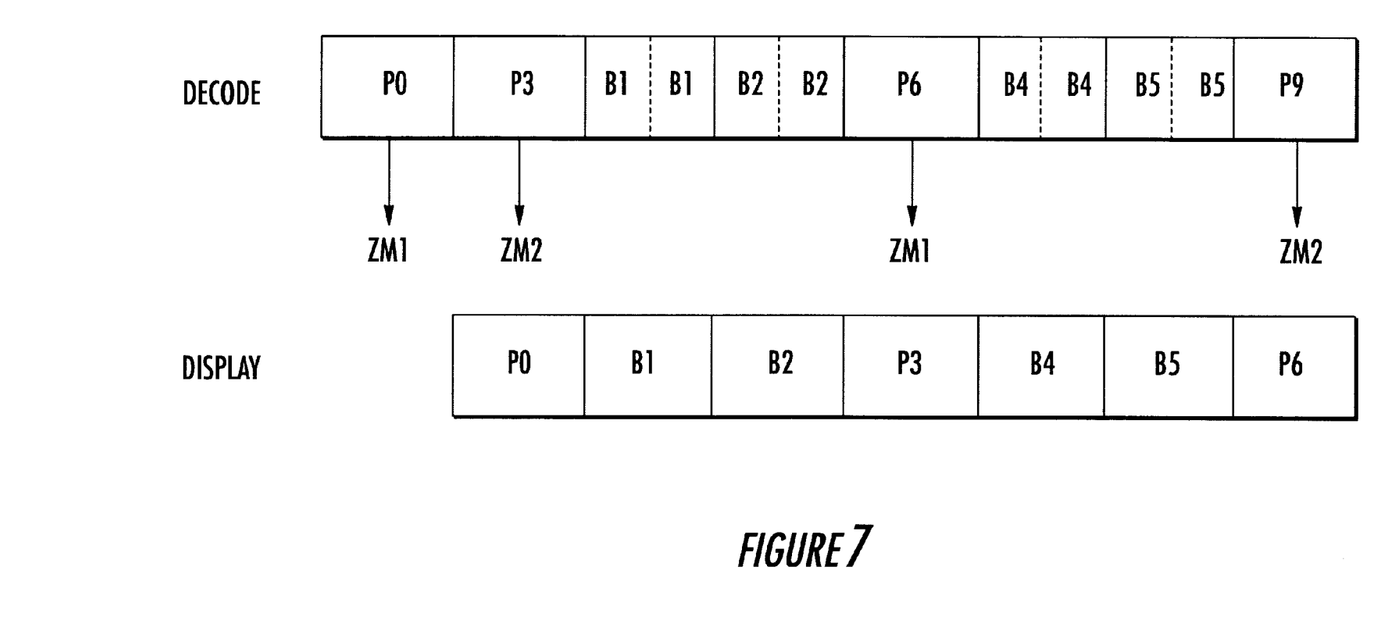
FIG. 7 illustrates the on-the-fly decoding and the displaying of a bidirectional image.

FIG. 7 represents a time chart of the decoding and displaying of a group of images. The images to be displayed in succession are designated by P0, B1, B2, P3, B4, B5, P6, where the letter P indicates a predicted image and the letter B a bidirectional image. Such a succession of images is conventional according to the MPEG standards. The reconstruction of each predicted image P requires predictor macroblocks fetched from the predicted image (or "intra" image not represented) which precedes it. The reconstruction of each bidirectional image B requires predictor macroblocks fetched from the two predicted images which flank it. Thus, the compressed data corresponding to the images arrive at the decoder DCD in a different order from that of display. Here, these compressed data arrive in the order P0, P3, B1, B2, P6, B4, B5.

Initially, the image P0 is decoded and stored in memory, for example in the area ZM1. While the image P3 is being decoded and stored in the area ZM2, the image P0 is displayed. Next, the image P1 is decoded a first time at double speed while the first frame of the image B1 is displayed on the fly. Then the image B1 is decoded a second time at double speed while the second frame of the image B1 is displayed. Each decoding of the image B1 by the decoding means MDC uses predictor macroblocks fetched from the images P0 and P3, which are stored in the areas ZM1 and ZM2. The same operations occur for the bidirectional image B2. Next, the image P6 is decoded and stored in the area ZM1 in place of the image P0 while the image P3 is displayed. The images B4 and B5 are, like the images B1 and B2, decoded twice at double speed while they are displayed. The decoding of the images B4 and B5 use predictor macroblocks to search in the images P3 and P6 which are stored in the areas ZM2 and ZM1.

To perform the decoding of the bidirectional images on the fly, the control means LMC are reprogrammed so as to twice perform the task of transferring to the pipeline circuit PPL the compressed data corresponding to each bidirectional image and stored in the area ZCD. In this regard, the control means are typically clocked at 25.5 MHZ, the pipeline circuit being itself clocked typically at 34 MHZ. Circuits operating at these speeds are entirely realizable within the usual technology.

Figure 8:
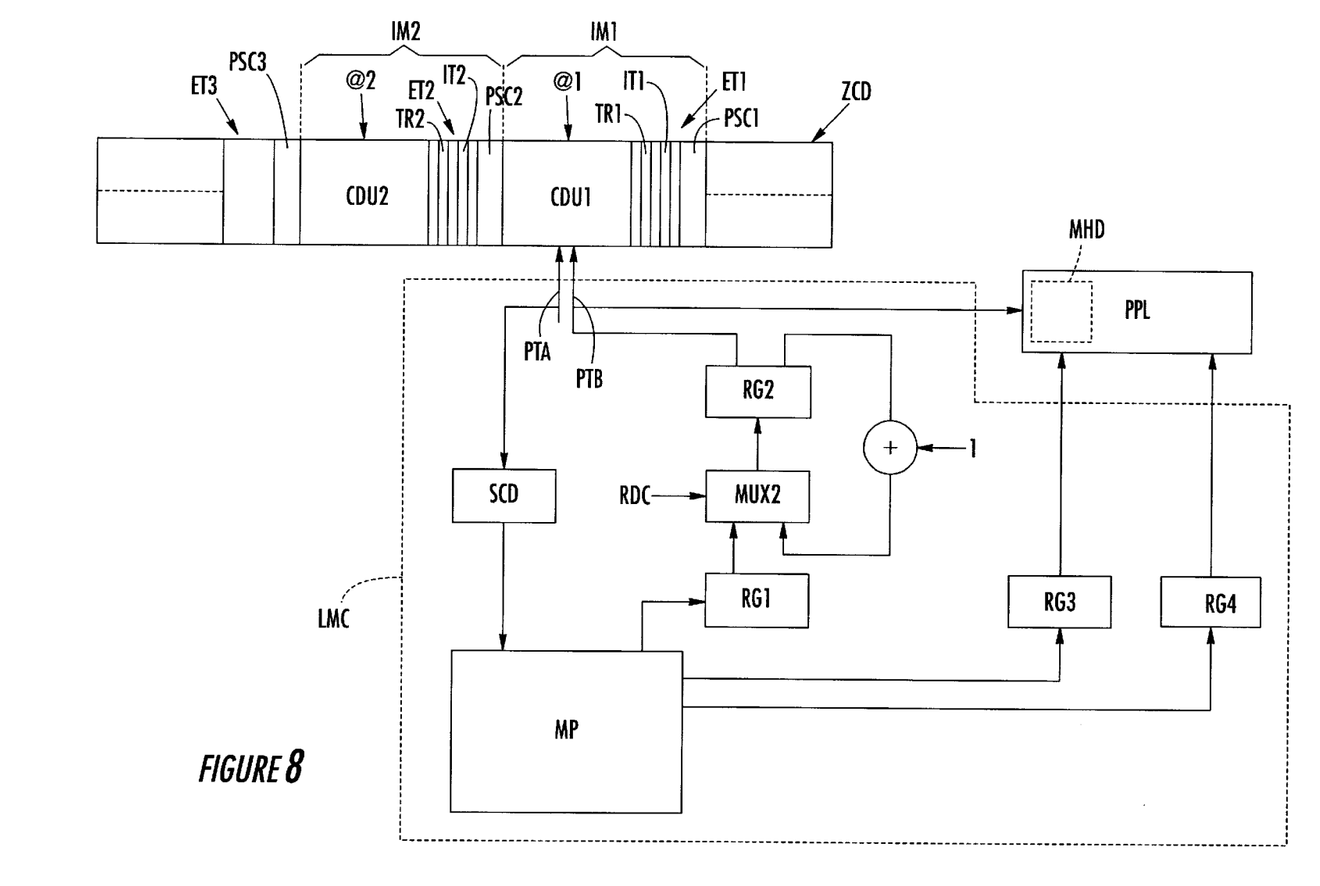
FIGS. 8 and 9 illustrate in greater detail a double decoding of a bidirectional image.
Figure 9:
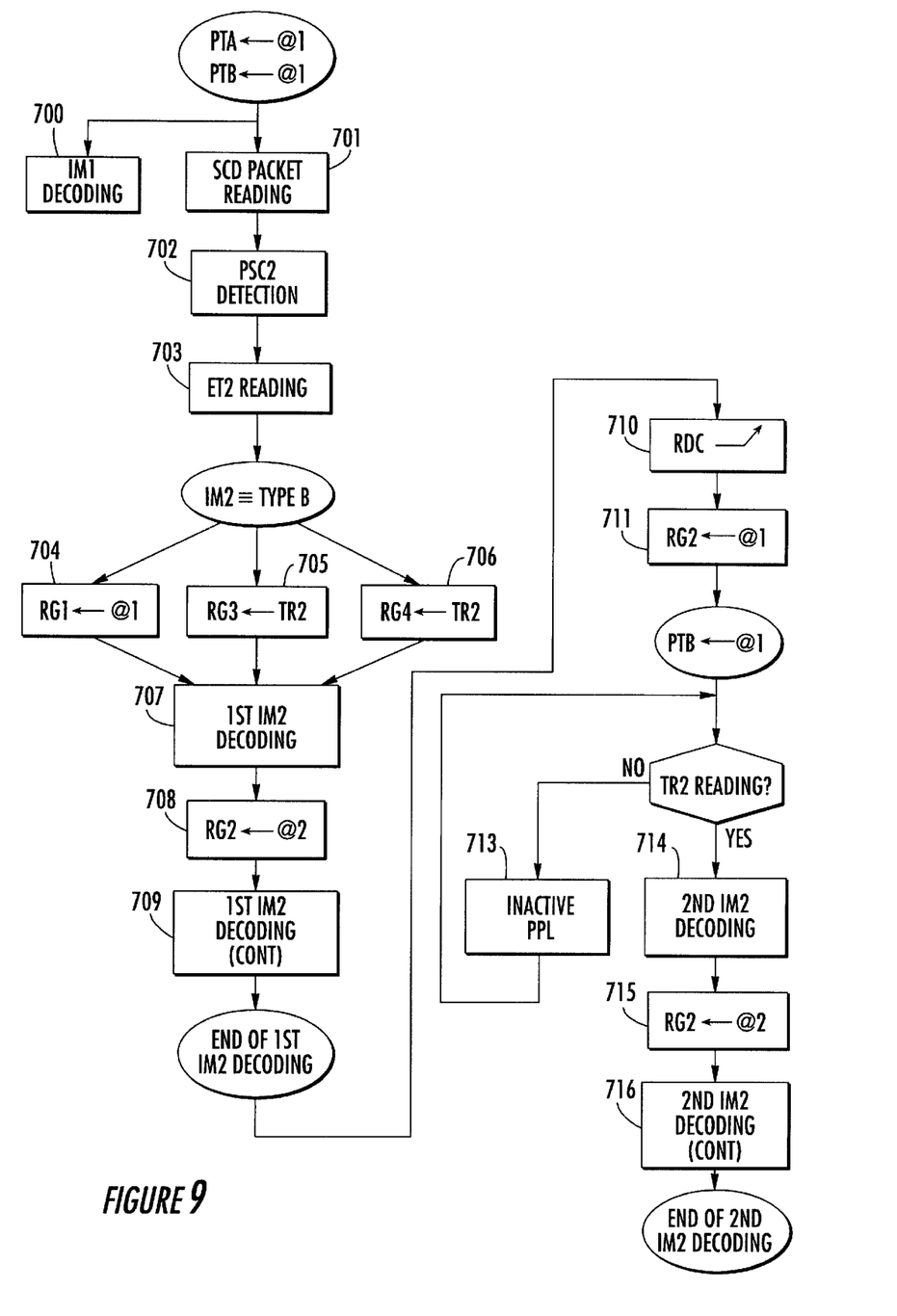

A particularly simple embodiment and mode of implementation making it possible for the control means LMC to deliver the compressed data twice to the pipelined circuit PPL is now described while referring more particularly to FIGS. 8 and 9. Conventionally, the stream of MPEG compressed data stored in the memory area ZCD comprises successive groups of compressed data, relating respectively to successive inbound images IM1, IM2, etc. Each data group associated with an image comprises a start-of-image identifier PSC (or "Picture Start Code") followed by a header ET. This header comprises in particular a specific identifier for the image, allowing one-to-one identification of the image in the image sequence. This specific identifier is, for example, here the Temporal Reference TR of the image. The header also comprises a cue IT identifying the type of image, for example "intra", "predicted" or "bidirectional". The header is followed by the useful data CDU of the image.

There is provision for a first address pointer PTA and for a second address pointer PTB each making it possible to read, in packets of bits, the memory area at the successive addresses @1, @2, etc. The control means LMC, architectured around processing means MP, composed of a microprocessor, comprise a start-of-image identifier detector SCD embodied for example in hard-wired form, and able to detect the presence or absence of a start-of-image identifier PSC in each bit packet extracted at the address pointed at by the first address pointer PTA. Pointer management means which are able to control the position of the second pointer PTB are also linked to the processing means MP. These pointer management means schematically comprise, for example, a first register RG1 whose output is linked to the input of a second register RG2 by way of a multiplexer MUX2 controlled by a control signal RDC representative of the control of a second decoding of an image. The output of the register RG2 is also looped back to its input by way of an address incrementation means and of the multiplexer MUX2. The register RG2 therefore contains the current address of the address pointer PTB.

A third register RG3 is able to store the temporal reference TR of an image while a fourth register RG4 is able to store the cue IT representative of the type of image to be decoded so as to allow the various means of the pipeline circuit PPL to decode the current image appropriately. In fact, each register RG3 and RG4 is able respectively to store the cues TR and IT of the current image undergoing decoding in the circuit PPL and also those of the next image.

Finally, decoding disabling means MHD, which have been represented here for simplification purposes inside the block PPL, but which could of course be located outside, receive the bits extracted from the memory and contained in the packet pointed at by the pointer PTB, and receive the contents of the register RG3. The function of these means MHD which can be embodied in hard-wired or software form is described in greater detail below.

The manner of operation of the elements which have just been described with reference to FIG. 8 will now be described while referring more particularly to FIG. 9. It is assumed that the decoding of the image IM1 is in progress in the pipeline circuit PPL (step 700) and that the two address pointers PTA and PTB are pointing at the address @1. The bit packet situated at the address @1, extracted from the memory area ZCD, is read by the detector SCD (step 701). The detector SCD then detects the presence of the start-of-image identifier PSC2 for the image IM2 (step 702). A signal representative of this detection is then sent to the microprocessor MP which reads the string of bits of the packet and in particular, the specific identifier ET2 for the image as well as the image's type IT2 (step 703). The image IM2 being of the bidirectional type, therefore requiring redecoding, the microprocessor MP stores in the register RG1 (step 704) the address @1 of the packet containing the start-of-image identifier PSC2 for the image IM2. Moreover, the temporal reference TR2 of the image IM2 is stored in the register RG3 (step 705) and the type IT2 of this image is stored in the register RG4 (step 706).

The first decoding of the image IM2 then begins in the pipeline circuit PPL with the aid of the useful data CDU2 originating from the same packet since the second address pointer PTB is also at the address @1. The register RG2 is next incremented so as to contain the address @2, this having the consequence of causing the address pointer PTB to point to this new address @2 (step 708). The address pointer PTA is moreover also incremented and also points to the address @2. The first decoding of the bidirectional image IM2 is continued with the remainder of the data CDU2 (step 709).

At the end of this first decoding, the pipeline circuit PPL delivers an end-of-decoding signal which has the effect, under the action of the control signal RDC issued by the microprocessor MP (step 710), of positioning the multiplexer MUX2 to its first input so forcing the contents of the register RG2 to the address @1 (step 711). Accordingly, the second address pointer PTB goes back so as to point to the address @1 address @1 again. A difficulty resides here in the fact that in an MPEG data stream, the intervals between the various start-of-image identifiers PSC for the various images are not constant and depend on the contents of the images. Consequently, this difficulty, in combination with the packetwise reading of the memory area ZCD, does not make it possible to ascertain accurately the location at which the start of the image IM2 is situated in the packet.

The invention solves this difficulty by using, in combination with the returning of the pointer PTB back to the address of the packet containing the start-of-image identifier PSC2 for the image to be redecoded, the temporal reference TR2 of the image to be redecoded. More precisely, the decoding disabling means MHD will then sequentially test the various bits of the packet which were read at the address @1 and compare this information with the specific identifier (temporal reference) TR2 of the image IM2, stored in the register RG3. And, so long as this comparison is not positive, i.e. so long as the presence of this temporal reference TR2 has not been detected again, the data supplied by the packet are not taken into account by the pipeline circuit PPL, thereby rendering the pipeline circuit PPL inactive (step 713).

It is only when the comparison result is positive, i.e. when the presence of the temporal reference TR2 has been detected again, that the means MHD authorize the circuit PPL to take the compressed data into account, allowing the second decoding of the bidirectional image (step 714). In the course of this second decoding, the register RG2 is again incremented so as to move the pointer PTB to the address @2 (step 715) so as to continue the second decoding of the image IM2 (step 716) to its end. Going back to the general manner of operation of the decoder DCD, the "intra" and "predicted" images are, by a conventional mechanism of queries, sent to the memory MMP at the output of the adder while each decoded bidirectional image B is transmitted, macroblock by macroblock, to the buffer memory FF2 by way of the multiplexer controlled by the signal STY issued by the control means LMC. When an "intra" or "predicted" image stored in the memory MMP is to be displayed, the multiplexer MUX is then instructed on its second input by the signal STY so as to store the macroblocks of the image, which were extracted successively from the memory MMP, in the buffer memory FF2.

The images output by the multiplexer MUX are stored sequentially in the buffer memory FF2, macroblock by macroblock. On the other hand, the video controller VDCTL requires line-by-line reception of the pixels of the image. It is for this reason that a block/line converter BRC is interposed between the buffer memory FF2 and the video controller VDCTL. As illustrated more precisely in FIG. 10, this converter BRC comprises an input interface IND receiving the various luminance and chrominance blocks of each macroblock stored in the buffer memory FF2. This input interface IND is controlled by an input controller INC by means of enquiry RQ and acknowledgment ACK signals. The data are then written in succession to an auxiliary memory MMA whose addresses $A_{i,j}$ are determined in succession by an address sequencer ADS. The various values of luminance Y and chrominance U and V are extracted line by line from the memory MMA and delivered to a filtering circuit FV which, when it is activated, makes it possible to perform a vertical filtering on these lines, i.e. for example, a weighted average between the various values of the pixels of these lines so as to deliver filtered values of luminance and chrominance. The converter BRC is generally controlled by a general controller MCTL receiving a frame synchronization signal VSYNC supplied by the video controller VDCTL. This signal VSYNC makes it possible to perform a parity selection. This is because, with each decoding, only one frame is displayed, i.e. just the even lines or just the odd lines. Thus, the converter BRC sorts among the lines of the blocks which it receives from the buffer memory FF2 those lines whose parity corresponds to that of the frame to be displayed. It is for this reason that the storage in the auxiliary memory MMA is referred to as half-macroblock by half-macroblock (each half-macroblock corresponding to eight lines). Thus, the capacity of this converter BRC is eight lines although the macroblocks correspond to sixteen lines. Stated otherwise, the memory MMA is capable of storing at least one row of half-macroblocks (for example a row of 45 half-macroblocks) corresponding to a predetermined number of lines of the frame to be displayed (in this instance eight).

Figure 10:
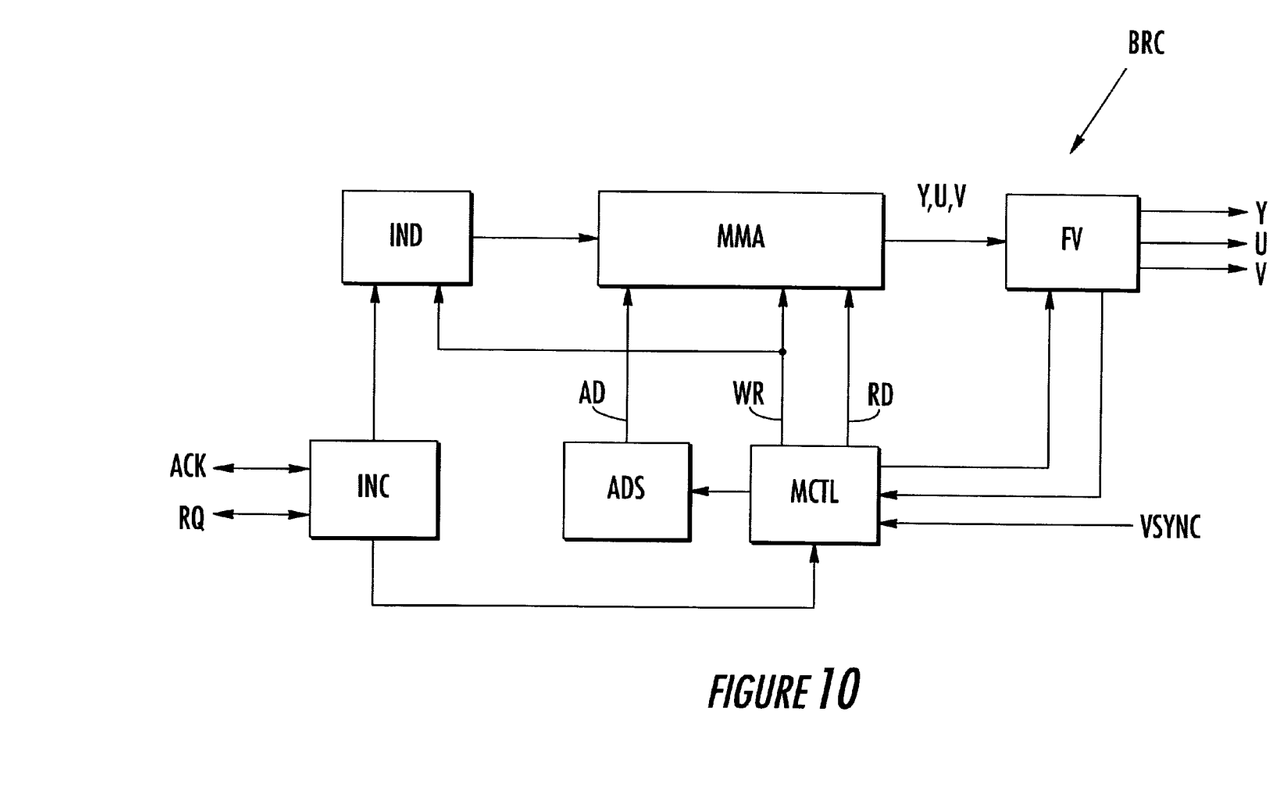
FIG. 10 is a more detailed schematic overview of a block/line converter according to the invention which can be used in particular during an on-the-fly decoding of bidirectional images.

The memory MMA is a dynamic memory which may be regarded as a large-size FIFO, with the exception of the fact that accesses are not consecutive since this memory is read linewise and written blockwise (in half-macroblocks). In fact, the control means MCTL and the address sequencer are programmed in such a way as to allow the sequential writing of the data of a half-macroblock as soon as sufficient room has been freed in the memory by the display procedure. More precisely, the address sequencer calculates the current address $A_{i,j}$ of the auxiliary memory at which current data intended for display is read before being replaced by current data of a half-macroblock by the following:

$$A_{i+1,j} = (A_{i,j} + x_j) \mathrm{modulo}(MN-1)$$

$$x_{j+1} = Nx_j \mathrm{modulo}(MN-1)$$

In this, $x_1=1$, M denotes the number of lines of the auxiliary memory, N denotes the number of data per line, and n denotes the total number of lines of each frame. Moreover, $0<i<MN-1$ and $1<j<n$.

By using this auxiliary memory of the converter BRC it is possible to limit the number of page openings for displaying "intra" or "predicted" images stored in the main memory MMP. This is because,. a given number nd of page openings makes it possible to store 8 lines of each frame of the image to be displayed, whereas if the pixels were extracted directly line by line from the memory MMP, then nd page openings per line would have been necessary.

That which is claimed is:

1. A method of decoding an image coded by compressed data, the image being of a type which requires data of at least one previously decoded image stored in a memory for its decoding, wherein the memory is a random-access synchronous dynamic memory comprising two memory banks organized into pages, the method comprising the steps of:

accessing pages of the memory by simultaneously opening two pages in the two memory banks to store respectively in the two open pages, two macroblocks belonging respectively to two consecutive rows of macroblocks and to a same column of macroblocks of the previously decoded image;

extracting a predictor macroblock of a size greater than or equal to the size of the macroblocks of the previously decoded image from the memory, the extracting comprising accessing pages of the memory to simultaneously open with each page access, the two pages in the two memory banks and respectively containing the two macroblocks belonging respectively to two consecutive rows of macroblocks and to the same column of macroblocks of the stored previously decoded image;

reading some of the pixels of the two macroblocks accessed during the page accessing, by column, to obtain some of the corresponding pixels of the predictor macroblock; and decoding each macroblock of the image.

2. A method according to claim 1, wherein the type of image which requires data of at least one previously decoded image stored in a memory for its decoding, is a bidirectional image, and further comprising the steps of:

decoding the bidirectional image a first time while a first frame of the image is displayed directly; and decoding the bidirectional image a second time while a second frame of the image is displayed directly, the first and second frames corresponding to lines of different parities of the image.

3. A method of decoding a compression coded image which requires data of at least one previously decoded image stored in a memory for its decoding, the method comprising the steps of:

storing respectively in two pages of the memory, two macroblocks belonging respectively to two consecutive rows of macroblocks and to a same column of macroblocks of a previously decoded image;

extracting a predictor macroblock from the memory by simultaneously opening the two pages of the memory which respectively contain the two macroblocks belonging respectively to two consecutive rows of macroblocks and to the same column of macroblocks of the previously decoded image;

reading some of the pixels of the two macroblocks, by column, to obtain some of the corresponding pixels of the predictor macroblock; and decoding the compression coded image.

4. The method according to claim 3, wherein the memory is a random-access synchronous dynamic memory comprising two memory banks organized into pages, and the two pages are situated respectively in the two memory banks.

5. The method according to claim 3, wherein the predictor macroblock is of a size greater than or equal to the size of the macroblocks of the previously decoded image.

6. The method according to claim 3, wherein the compression coded image is decoded macroblock by macroblock.

7. A method according to claim 3, wherein the type of image which requires data of at least one previously decoded image stored in a memory for its decoding, is a bidirectional image, and further comprising the steps of:

decoding the bidirectional image a first time while a first frame of the image is displayed directly; and decoding the bidirectional image a second time while a second frame of the image is displayed directly, the first and second frames corresponding to lines of different parities of the image.

8. A method of decoding a compression coded bidirectional image, the method comprising the steps of:

storing respectively in at least two pages of a memory, at least two macroblocks belonging respectively to at least two consecutive rows of macroblocks and to a same column of macroblocks of a previously decoded image;

extracting a predictor macroblock from the memory by simultaneously opening the at least two pages of the memory;

reading some of the pixels of the at least two macroblocks, by column, to obtain some of the corresponding pixels of the predictor macroblock; and decoding the compression coded bidirectional image.

9. A method according to claim 8, wherein the memory is a random-access synchronous dynamic memory comprising at least two memory banks organized into pages, and the at least two pages are situated respectively in the at least two memory banks.

10. A method according to claim 8, wherein the predictor macroblock is of a size greater than or equal to the size of the macroblocks of the previously decoded image.

11. A method according to claim 8, wherein the compression coded bidirectional image is decoded macroblock by macroblock.

12. A method according to claim 8, further comprising:

decoding the bidirectional image a first time while a first frame of the image is displayed directly; and decoding the bidirectional image a second time while a second frame of the image is displayed directly, the first frame corresponding to odd lines of the image and the second frame corresponding to even lines of the image.

13. A device for processing compressed images, the device comprising:

decoding means for decoding a current image macroblock by macroblock;

a memory, linked to the decoding means, for storing at least some decoded images, the memory being a random-access synchronous dynamic memory comprising two memory banks organized into pages; and control means, linked to the decoding means and to the memory, for accessing pages of the memory by simultaneously opening two pages situated respectively in the two memory banks so as to store respectively in the two open pages, two macroblocks belonging respectively to two consecutive rows of macroblocks and to the same column of macroblocks of the previously decoded image, and for extracting from the memory, for the decoding of each macroblock of the inbound image, a predictor macroblock of a size greater than or equal to the size of the macroblocks of the previously decoded image stored in memory, by accessing pages of the memory to simultaneously open the two pages situated respectively in the two memory banks and respectively containing the two macroblocks belonging respectively to two consecutive rows of macroblocks and to the same column of macroblocks of the stored previously decoded image, and for reading some of the pixels of the two macroblocks, by column, so as to obtain some of the corresponding pixels of the predictor macroblock.

14. A device according to claim 13, wherein a compressed bidirectional type image to be processed requires data of at least one previously decoded image stored in a memory for its decoding, and wherein the decoding means is for decoding each bidirectional type image a first time while a first frame of the image is displayed directly, and for decoding the bidirectional type image a second time while a second frame of the image is displayed directly, the two frames corresponding to lines of different parities of the image.

15. A device for processing compressed images, wherein a compressed bidirectional type image to be processed requires data of at least one previously decoded image stored in a memory for its decoding, the device comprising:

a decoder for decoding compressed images including decoding of a bidirectional type image;

a memory for storing at least some decoded images, the memory being organized into pages; and a controller for storing respectively in two pages of the memory, two macroblocks belonging respectively to two consecutive rows of macroblocks and to the same column of macroblocks of the previously decoded image, and for extracting a predictor macroblock from the memory by simultaneously opening the two pages of the memory, and for reading some of the pixels of the two macroblocks, by column, so as to obtain some of the corresponding pixels of the predictor macroblock.

16. A device according to claim 15, wherein the memory is a random-access synchronous dynamic memory comprising two memory banks organized into pages, and the two pages are situated respectively in the two memory banks.

17. A device according to claim 15, wherein the predictor macroblock is of a size greater than or equal to the size of the macroblocks of the previously decoded image.

18. A device according to claim 15, wherein the compressed images are decoded macroblock by macroblock.

19. A device according to claim 15, wherein the decoder is for decoding each bidirectional type image a first time while a first frame of the image is displayed directly, and for decoding the bidirectional type image a second time while a second frame of the image is displayed directly, the first frame corresponding to odd lines of the image and the second frame corresponding to even lines of the image.

* * * * *